(12) United States Patent
Cho

(10) Patent No.: US 6,292,228 B1
(45) Date of Patent: Sep. 18, 2001

(54) DEVICE AND METHOD FOR AUTO-ADJUSTMENT OF IMAGE CONDITION IN DISPLAY USING DATA REPRESENTING BOTH BRIGHTNESS OR CONTRAST AND COLOR TEMPERATURE

(75) Inventor: Yong-Jin Cho, Chungchongnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/306,440

(22) Filed: May 6, 1999

(30) Foreign Application Priority Data

Jun. 29, 1998 (KR) .................................................. 98-24960

(51) Int. Cl.$^7$ ........................................................ H04N 5/58
(52) U.S. Cl. .............................................. 348/603; 348/656
(58) Field of Search ................................. 348/602, 603, 348/655–658; 345/153, 154, 207, 431

(56) References Cited

U.S. PATENT DOCUMENTS 4,742,387 * 5/1988 Oshima ................................... 358/29
5,325,195 * 6/1994 Ellis et al. ............................. 348/180
6,081,254 * 6/2000 Tanaka et al. ........................ 345/154

FOREIGN PATENT DOCUMENTS

| 0 700 218 A2 | 6/1996 | (EP) . |
| 0 863 677 A1 | 9/1998 | (EP) . |
| 10174017 | 6/1998 | (JP) . |

* cited by examiner

Primary Examiner—Victor R. Kostak
(74) Attorney, Agent, or Firm—Fleshner & Kim, LLP

(57) ABSTRACT

A device and method for automatically adjusting an image condition in a display is, disclosed. The present device and method optimizes the image condition of a display according to individual preferences by taking into account the brightness and color temperature set initially by a user. Particularly, the present invention includes a photo sensor to detect the environmental illumination and a micro processor utilizing the detected data to appropriately adjust the image condition with respect to a user 柁 preference.

27 Claims, 3 Drawing Sheets

DEVICE AND METHOD FOR AUTO-ADJUSTMENT OF IMAGE CONDITION IN DISPLAY USING DATA REPRESENTING BOTH BRIGHTNESS OR CONTRAST AND COLOR TEMPERATURE

BACKGROUND OF THE INVENTION

1. Field of the Invention

The present invention relates to display devices, and more particularly to a device and method for automatically adjusting image conditions on a display. The present invention automatically adjusts the image condition with consideration of a condition set initially by a user when the brightness around the display and color temperature vary.

2. Background of the Related Art

Ceaseless developments of technologies for automatic adjustment of a displayed image condition have been made to provide a convenient and better viewing environment for a user. The technology for automatically adjusting the image condition is applied to displays such as a television (TV) or a computer monitor, and may be implemented in variety of forms. For such displays, the image conditions of brightness, contrast, and color temperature may be automatically adjusted according to an environmental luminance and color temperature utilizing a pre-established look-up table.

The look-up table is established by experimentally obtaining image conditions, i.e. contrast and brightness with respect to outputs of color signals detected from actual environmental luminance and color temperatures, and color signals from theoretical brightness and color temperatures. The look-up table is stored in a memory, and according to a detected environmental luminance and color temperature, a contrast and brightness of an image corresponding to the detected values are output from the look-up table. Thus, the contrast and brightness of the image is adjusted based upon the detected color signals of an actual environment.

Generally, a TV is viewed by a user from a certain distance during the evenings after sunset under an illumination, while a computer monitor is viewed by a user from a close range during the day in an office. Thus, the image conditions for the TV and the monitor are different. Also, a slightly poor focus and resolution does not greatly affect watching the TV because moving pictures are displayed on the TV. However, the focus and resolution affects the viewing of a monitor because most of the work on the monitor is conducted by viewing a still image such as a text or a graphic. Thus, the required image condition for the monitor varies, depending on the work.

Although an image condition is adjusted to an optimal condition for an environmental brightness and color temperature, because the adjustment is made utilizing a look-up table, an image of high quality cannot be provided. Particularly, the adjustment is made automatically according to a preset data without any consideration to a user's preferences or set values, which results in differences between the adjusted values and the actual environimental conditions.

SUMMARY OF THE INVENTION

Accordingly, an object of the present invention is to solve at least the problems and disadvantages of the related art.

An object of the present invention is to provide a device and method for automatically adjusting image conditions in a display allowing an optimal image condition regardless of varied environmental luminance conditions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a device for automatically adjusting an image condition of a display includes a color signal sensing unit sensing a color signal of an environmental luminance around a display; a recognition unit processing the color signal of the environmental luminance sensed by the color signal sensing unit and recognizing an environmental brightness and an environmental color temperature of the display; a storage unit storing a brightness, a contrast and a color temperature of an image set by a user, and the environmental brightness and the environmental color temperature of the display recognized by the recognition unit; a comparison unit calculating an average of the environmental brightness and the environmental color temperature of the display for a predetermined period, and comparing the average data to a reference data of the environmental brightness and environmental color temperature of the display stored in the storage unit to obtain variations of the calculated average data; and a control unit storing the environmental brightness and environmental color temperature recognized through the recognition unit as the reference data when the user selects an automatic adjusting mode, and reflecting the respective variations of the brightness and the color temperature calculated by the comparison unit to the brightness, the contrast, and the color temperature of the image set by the user, thereby adjusting an image condition.

In the preferred embodiment, the color signal sensing unit may be a photosensor providing two outputs of cyan and yellow. Also, the recognition unit recognizes a sum of the cyan and the yellow from the color signal sensing unit as the environmental brightness of the display and a ratio of the cyan to the yellow from the color signal sensing unit as the environmental color temperature of the display.

A method for automatically adjusting image conditions of a display according to the present invention includes (1) storing a brightness, a contrast, and a color temperature of an image set by a user; (2) determining execution of an automatic adjustment mode in which the brightness, the contrast, and the color temperature of the image are adjusted automatically according to a variation of an environmental brightness; (3) upon determining an execution of the automatic adjustment mode in (2), sensing the environmental brightness and the color temperature, storing the sensed environmental brightness and the color temperature as the reference data of the environmental brightness and the color temperature, and calculating the average data on the environmental brightness and the color temperature for a predetermined period; (4) comparing the average data on the environmental brightness and the color temperature calculated in (3) to the reference data on the environmental brightness and the color temperature, and calculating respective variations, and (5) reflecting the respective variations calculated in (4) to the brightness, the contrast, and the color temperature set by the user in (1), to adjust an image condition.

The execution of automatic adjustment mode in (2) includes both an execution of automatic adjustment mode in which the brightness and the contrast of the image are adjusted, and an execution of automatic adjustment mode in which the color temperature of the image is adjusted, wherein the user is allowed to select at least one of the automatic adjustment modes. Also, the reflection in (5) further includes the step of gradually adjusting the image condition by taking a linear intermediate value when a difference of the value set by the user and a value to which the relative variation is reflected is over a preset level.

BRIEF DESCRIPTION OF THE DRAWINGS

The invention will be described in detail with reference to the following drawings in which like reference numerals refer to like elements wherein.

DETAILED DESCRIPTION OF TEE PREFERRED EMBODIMENT

Reference will now be made in detail to the preferred embodiments of the present invention, examples of which are illustrated in the accompanying drawings.

Figure 1:
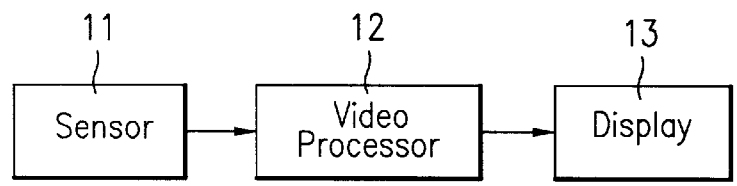
FIG. 1 is a block diagram showing a device for automatically adjusting an image condition of a display according to the present invention.

FIG. 1 shows a device for automatically adjusting an image condition of a display according to the present invention including a sensor unit 11 sensing an environmental brightness and color temperature, and outputting the sensed data; a video processor 12 receiving and digitizing the output signals from the sensor unit 11 to obtain the environmental brightness and color temperature around the display, and adjusting the brightness, contrast, and color temperature of an image utilizing the obtained data in consideration of the brightness, contrast and color temperature selected by a user; and a display unit 13 displaying the adjusted image on a display.

In the preferred embodiment, the sensor unit 11 is a photo sensor and the video processor 12 includes a micro processor. Also, the video processor 12 automatically adjusts the image for displays, such as a TV or a computer monitor, according to the output signals from the photo sensor utilizing a relative variation of brightness, contrast and color temperature in combination with the brightness, contrast and color temperature set initially by a user according to the use 휠 viewing preferences.

Figure 2:
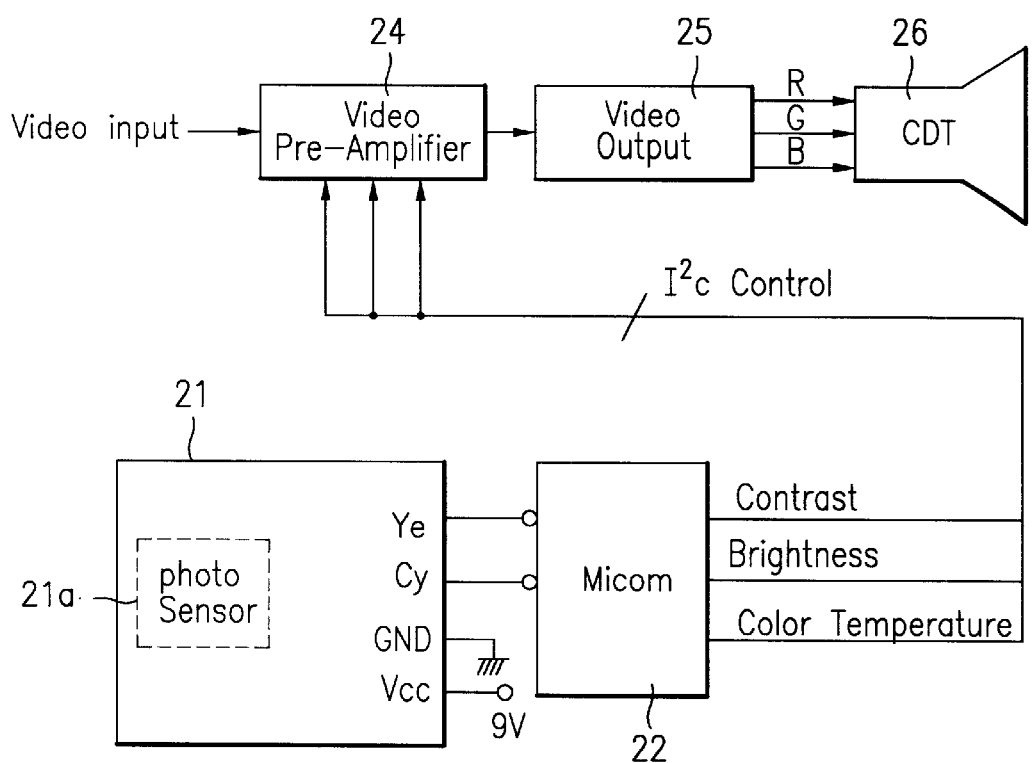
FIG. 2 is a block diagram showing a device for automatically adjusting an image condition of a computer monitor according to the present invention.

FIG. 2 shows a device for automatically adjusting an image condition of a computer monitor according to the present invention including a sensor unit 21 sensing an environmental brightness and color temperature, and outputting the sensed data; a micro processor 22 receiving and digitizing the output signals from the sensor unit 21 to obtain the environmental brightness and color temperature around the monitor, and outputting control signals to adjust the brightness, contrast, and color temperature of an image utilizing the obtained data in consideration of the brightness contrast and color temperature selected by a user; a video pre-amplifier 24 amplifying a video signal to adjust the image according to the control of the micro processor 22; a video output unit 25 processing the adjusted image for display; and a color display tube (CDT) display 26 displaying the adjusted image.

As in the sensor unit 11 of FIG. 1, the sensor unit 21 is a photo sensor 21a in the preferred embodiment and outputs the sensed data by two electrical signals as cyan (Cy) and yellow (Ye). The cyan Cy being sensitive to blue and the yellow Ye being sensitive to red, the output signals Cy and Ye are processed through an analog-to-digital converter in a video processor such as the micro processor 22, to determine the brightness and the color temperature around the monitor. Particularly, the environmental brightness is obtained as a sum of the outputs (Cy+Ye) from the photosensor 21a, utilizing the sensitivity of cyan Cy to blue light and the sensitivity of yellow Ye to red light. Similarly, the environmental color temperature is obtained as a ratio of cyan Cy to the Yellow Ye (Cy/Ye).

Generally, when light from an incandescent lamp or an incandescent lamp and a fluorescent lamp are present in the surrounding environment, an output of cyan Cy is lower than an output of yellow Ye. However, when light primarily from a fluorescent lamp is present in the surrounding environment, the output of cyan Cy is equal to or greater than the output of yellow Ye. Moreover, when natural light is primarily present, the output of cyan Cy is greater than the output of yellow Ye. Utilizing the various reaction of cyan and yellow to light, the sum (Cy+Ye) and the ratio (Cy/Ye) of cyan Cy and yellow Ye can be used as the environmental brightness and the environmental color temperature, respectively.

In the preferred embodiment of a device for automatically adjusting an image condition of a TV, the sensor unit is also a photo sensor as described with reference to FIG. 2 and the signals Cy and Ye are processed through an analog-to-digital converter in a video processor such as the micro processor 22, to determine the brightness and the color temperature around the monitor and to adjust the brightness, contrast, and color temperature of an image in consideration of the brightness, contrast and color temperature selected by a user. The image with the adjusted condition is similarly processed as the image for the CDT and is displayed on a TV screen. A method for automatically adjusting an image condition in a display will be explained with reference to FIG. 3.

Figure 3:
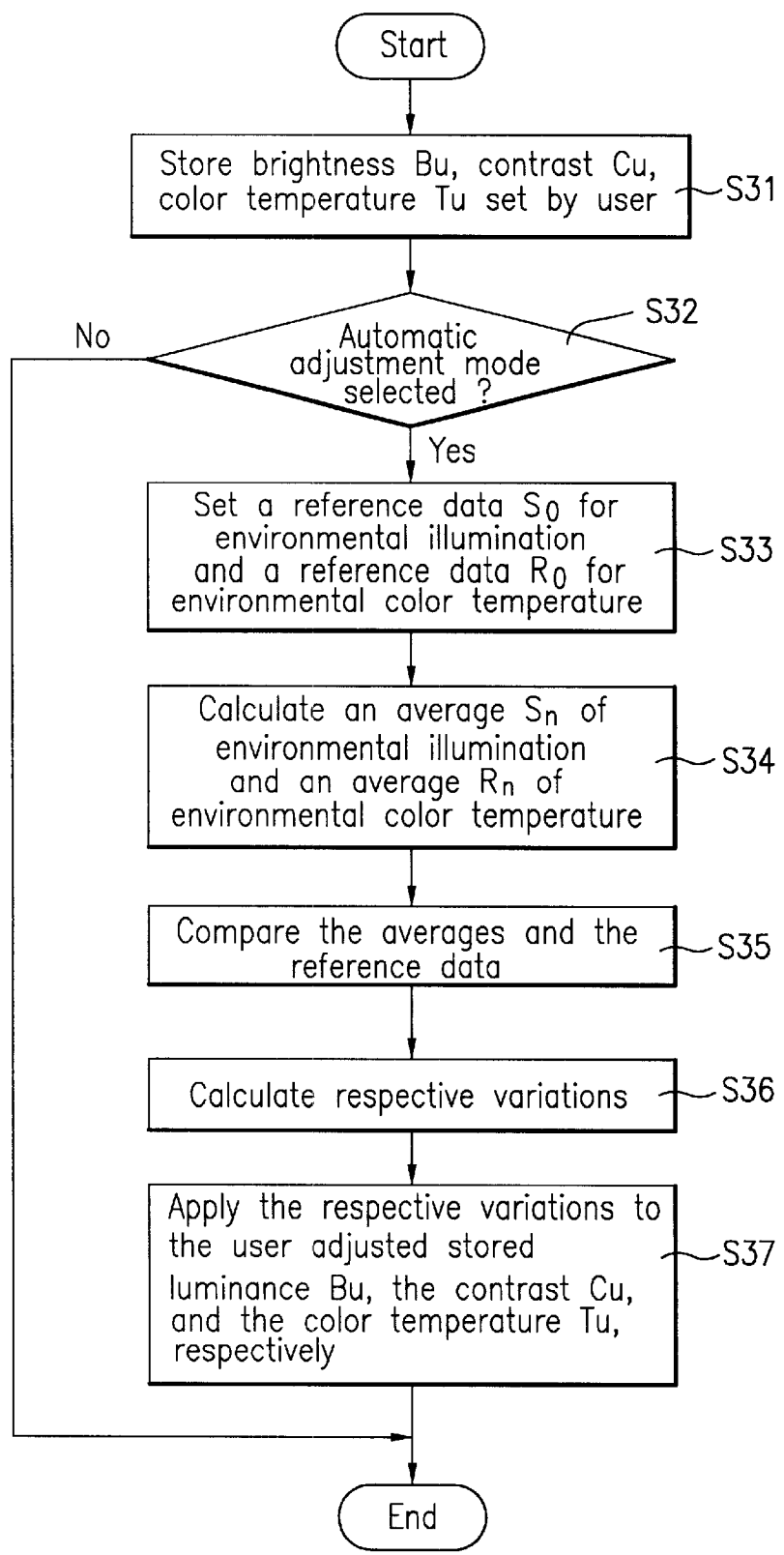
FIG. 3 is a flow chart showing a method for automatically adjusting an image condition of a computer monitor according to the present invention.

FIG. 3 illustrates a flow chart of a method for automatically adjusting an image condition of a display according to the present invention. Generally, different users have varying preferences for viewing a display, and initially sets the brightness, contrast and color temperature of the display. Thus, when a user manually sets a brightness, contrast and color temperature of an image in a manual regulation mode, the micro processor 22 stores the brightness Bu, the contrast Cu, and the color temperature Tu of the image set by the user in a storage unit (step S31). A determination is made whether the user has selected an auto-regulation mode (step S32), and if selected, an environmental brightness reference data $S_0$ and a color temperature reference data $R_0$ are set (step S33).

Upon selecting the auto-regulation mode, the brightness, contrast and the color temperature of the image is automatically regulated to maintain a level equivalent to the preference set by the user, when the illumination of the surrounding environment changes. Thus, the user would be able to view an image consistently at a condition set initially according to the user's preference, even if the illumination were to change in the surrounding environment. It should be noted that the preference set by the user would be the default setting of the display if the user did not manually set a brightness, contrast and color temperature.

An explanation of how an image condition is regulated using the cyan Cy and the yellow Ye will be given with reference to equations below.

$$S_0 = Cy_0 + Ye_0 \quad (1a)$$

$$R_0 = \frac{Cy_0}{Ye_0} \quad (1b)$$

As expressed in equations (1a) and (1b), a reference data of an environmental brightness $S_0$ is set as a sum of cyan Cy and yellow Ye received from the sensor unit 21, and a reference data of an environmental color temperature $R_0$ is set as a ratio Cy/Ye of cyan Cy to yellow Ye received from the sensor unit 21.

$$Sa = \frac{S}{n} \quad (2a)$$

$$Ra = \frac{R}{n} \quad (2b)$$

where, $S = S_1 + S_2 + S_3, \ldots + S_{n-1} + S_n$, $S_n = Cy_N + Ye_n$, and
$R = R_1 + R_2 + R_3, \ldots + R_{n-1} + R_n$, $R_n = Cy_n/Ye_n$.

Utilizing equations (2a) and (2b), the average of the environmental brightness Sa and the average of the environmental color temperature Ra are obtained from the cyan Cy and yellow Ye output by the sensor unit 1, for a predetermined period of time (step S34).

$$Sd = S_0 - Sa \quad (3a)$$

$$Rd = R_0 - Ra \quad (3b)$$

After obtaining the average values of the environmental brightness and environmental color temperature, Sa and Ra are compared to the reference data $S_0$ and $R_0$ respectively, as shown in equations (3a) and (3b) (step S35). The results of the comparison are utilized in equations (4a)–(4c) below to determine the relative amounts of adjustment necessary in the image condition, with respect to the preference of the user (step S36).

$$\Delta B = X\left(\frac{Sd}{\Delta V_S}\right) \quad (4a)$$

$$\Delta C = W\left(\frac{Sd}{\Delta V_S}\right) \quad (4b)$$

$$\Delta R = Y\left(\frac{Rd}{\Delta V_R}\right) \quad (4c)$$

In equation 4, $\Delta B$, $\Delta C$ and $\Delta R$ are the relative amounts of adjustment or relative variances for the image condition. In equation (4b), $\Delta V_S$ is a value of the variation in the environmental brightness, i.e. the sum Cy+Ye obtained from the output of the photosensor 21a, when the illumination in the surrounding environment changes by a preset level. In the preferred embodiment, $\Delta V_S$ is the variation when the illumination changes by 50 Lux. The value of $\Delta V_S$ is predetermined and stored in a storage unit within the micro processor 22.

In equations (4a) and (4c), $\Delta V_R$ is a value of the variation in the color temperature of the environmental brightness, i.e. the ratio Cy/Ye obtained from the output of the photosensor 21a, when the color temperature in the surrounding environment changes by a preset level. In the preferred embodiment, $\Delta V_R$ is the variation when the color temperature changes by 3000K. The value of $\Delta V_R$ is likewise predetermined and stored in a storage unit within the micro processor 22. Also, $\Delta V_R$ may be stored in the same or a different storage unit from $\Delta V_S$, and both $\Delta V_R$ and $\Delta V_S$ may be stored in the same or different storage unit from Bu, Cu, and Tu in step S31.

The coefficients X, W, and Y are predetermined values representing the amounts of adjustment made by a typical user on the brightness, the contrast and color temperature of an image, respectively, when the environmental illumination and color temperature varies. For example, if a typical user initially sets the contrast to 85 in an environmental illumination of 200 Lux, but adjusts the contrast to 95 when the environment becomes brighter to 300 Lux and adjusts the contrast to 80 when the environment becomes darker to 150 Lux, the variation of the contrast for every 50 Lux is 5, i.e. W 5. The coefficients X and Y can similarly be obtained by determining the brightness and color temperature preferred by a typical user as the brightness and color temperature varies, respectively.

Moreover, if one or more objects, such a piece of furniture or plant, are close to the photosensor 21 a during the calculation of the relative variations, the two outputs Cy and Ye from the photosensor 21a may slightly vary depending upon the material and color of the object regardless of any actual variation in the environmental illumination. Therefore, the effects of object placement, although minimal, may be taken into consideration during the determination of the coefficients X, W and Z by varying the placement of different objects, as a variable, with respect to the photosensor 21a before obtaining X, W and Z. In the preferred embodiment, the coefficients X=3, W=5 and Y=1000.

Once the relative variations $\Delta B$, $\Delta C$ and $\Delta R$ are obtained through the above process, the level of adjustment for an optimal condition of the image with respect to brightness, contrast and color temperature is determined by equations (5a)–(5c) below (step S37).

$$B = Bu + \Delta B \quad (5a)$$

$$C = Cu + \Delta C \quad (5b)$$

$$T = Tu + \Delta R \quad (5c)$$

In equation 5, B is a brightness of the image after completion of an image condition adjustment, C is a contrast of the image after completion of an image condition adjustment, and T is a color temperature of the image after completion of an image condition adjustment. Because the brightness, contrast and color temperature are adjusted with consideration of the individual preferences of users by utilizing the relative variations $\Delta B$, $\Delta C$ and $\Delta T$, an optimal image for each individual user may be achieved.

Figure 4:
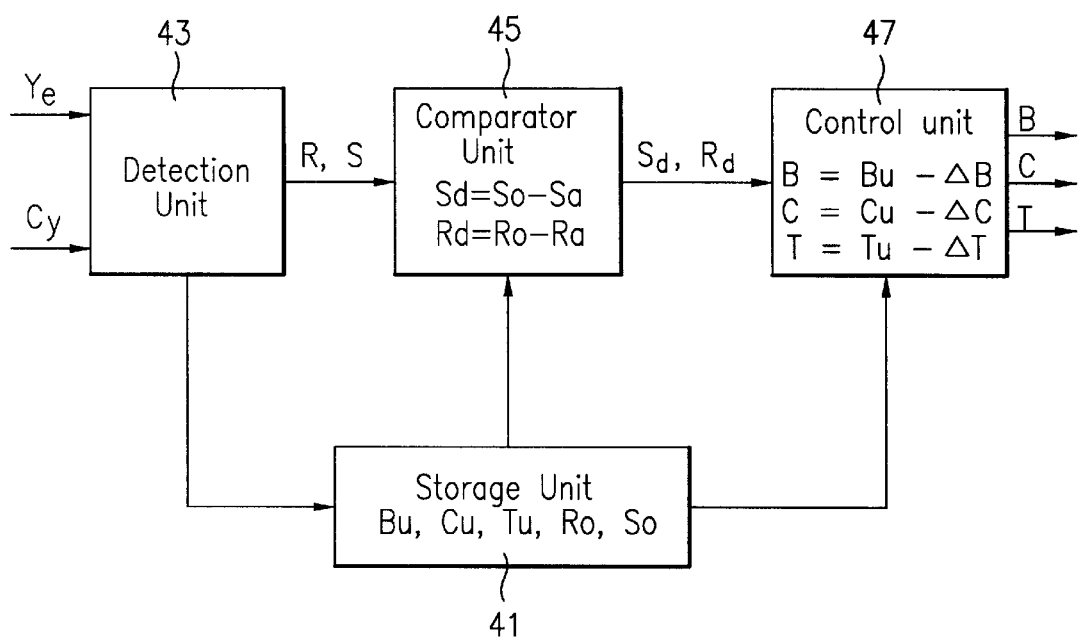
FIG. 4 is a block diagram of a micro processor in FIG. 2.

As discussed above, a micro processor determines the brightness and the color temperature around the monitor and to adjust the brightness, contrast, and color temperature of an image in consideration of the brightness, contrast and color temperature selected by a user. Particularly, FIG. 4 shows a block diagram of a micro processor including a storage unit 41 storing the brightness Bu, contrast Cu, and color temperature Tu input by a user, and storing the reference environmental brightness $S_0$ and color temperature $R_0$, a detection unit 43 determining the brightness and color temperature around the monitor as (Cy+Ye) and (Cy/Ye) respectively; a comparator unit 45 calculating an average brightness Sa and color temperature Ra in the environment for a predetermined time period according to equation 2, and comparing Sa and Ra to $S_0$ and $R_0$ from the storage unit according to equation 3; and a control unit 47 determining the relative variances ΔB, ΔC and ΔR utilizing the, compared values Sd and Rd according to equation 4, and outputting control signals to adjust the image by the calculated relative variances ΔB, ΔC and ΔR and Bu, Cu and Tu stored in the storage unit, respectively, according to equation 5.

Therefore, in the present device and method for automatically adjusting an image condition, the brightness Bu, contrast Cu, and color temperature Tu input by a user are stored; the average values Sa and Ra are compared to the reference values $S_0$ and $R_0$, of the environmental brightness and color temperature, respectively, to calculate the difference Sd and Rd according to equations (3a) and (3b). The calculated differences Sd and Rd are utilized to calculate the relative variations ΔB, ΔC and ΔR of the brightness, contrast and the color temperature according to equations (4a)–(4c). Finally, the image is adjusted by an amount of the relative variances in addition to the stored brightness Bu, contrast Cu, and color temperature Tu.

Also, abrupt or sharp changes of the brightness and the color temperature of the image, which would occur when the average data of a predetermined period differs greatly from a user 월 set values, may cause fatigue in the eyes of the user. As a result, the brightness, contrast and color temperature of the image are increased or decreased gradually during the image condition adjustment in the preferred embodiment. Moreover, a user may only want an automatic adjustment of brightness and contrast or an automatic adjustment of color temperature. Accordingly, an automatic regulation mode for the brightness and contrast of the image, and an automatic regulation mode for the color temperature of the image may be separately provided for the user 월 selection.

As discussed above, the device and method for automatically adjusting the image condition of a display according to the present invention facilitates an automatic adjustment of an image, taking into consideration a variation which may occur due to a brightness, contrast and color temperature set initially by a user. Thus, the present invention provides an optimal image condition preferred by individual users with respect to environmental brightness and color temperature. The present device and method for automatically adjusting the image condition in a display especially provide an optimal image condition desired by individual users when the present invention is applied to TV and a computer monitor, requiring different image conditions depending on an environment of use.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for adjusting an image condition comprising:
    a sensor unit sensing two color variables that represent both an environmental brightness and a color temperature, and outputting the sensed data;
    a video processor receiving and digitizing the output signals from the sensor unit to obtain the environmental brightness and color temperature, and adjusting the brightness, contrast, and color temperature of an image utilizing the obtained data in consideration of a prescribed brightness, contrast and color temperature; and
    a display unit displaying the adjusted image on a display.

2. A device of claim 1, wherein the sensor unit is a photo sensor outputting the sensed data by two electrical signals; and wherein the video processor digitizes the two electrical signals to determine the environmental brightness and the color temperature, wherein the prescribed brightness, contrast and color temperature are selected by a user.

3. A device of claim 2, wherein the photo sensor outputs the two electrical signals of cyan and yellow; and wherein the video processor determines the environmental brightness by summing the outputs of cyan and yellow, and determines the environmental color temperature by taking the ratio of the output cyan to the output yellow.

4. A device of claim 2, wherein the video processor comprises:
    a first storage unit storing the brightness, contrast and color temperature selected by the user; and
    a micro processor determining the environmental brightness and color temperature, and determining relative variances of brightness, contrast and color temperature according to the determined environmental brightness and color temperature, said micro processor outputting control signals to automatically adjust the brightness, contrast and color temperature of the image based upon the relative variances and the stored brightness, contrast and color temperature.

5. A device of claim 4, wherein the display unit displays the image on a color display tube; and wherein the video processor further comprises:
    a video pre-amplifier amplifying a video signal according to the control signals output by the micro processor; and
    a video output unit processing the amplified video signal and displaying the processed video signal on the color display tube.

6. A device of claim 4, wherein the micro processor comprises:
    a second storage unit storing reference environmental values of brightness and color temperature, wherein the first storage unit is located in the micro processor;
    a detection unit determining the environmental brightness and color temperature based upon the two electrical signals from the sensor unit;
    a comparator unit calculating average environmental values of brightness and color temperature for a predetermined time period, and comparing the average environmental values to the reference environmental values stored in the second storage unit to output compared values; and
    a control unit determining relative variances utilizing the compared values, and outputting the control signals to automatically adjust the image by an amount based upon the determined relative variances and the brightness, contrast, and color temperature selected by the user.

7. A device of claim 6, wherein the sensor unit outputs electrical signals of cyan and yellow; and the detection unit determines the environmental brightness by summing the outputs of cyan and yellow, and determines the environmental color temperature by taking the ratio of the output cyan to the output yellow.

8. A device of claim 1, wherein the video processor automatically adjusts the brightness, contrast and color temperature of an image if a user selects an auto-regulation mode, and wherein the video processor uses the same two color variables to concurrently determine both the environmental brightness and the color temperature, wherein the environmental brightness includes contrast and brightness.

9. A device of claim 1, wherein the video processor automatically adjusts the brightness and contrast of an image if a user selects an auto-regulation mode for brightness and contrast, and automatically adjusts the color temperature of an image if the user selects an auto-regulation mode for color temperature.

10. A device of claim 1, wherein the video processor automatically adjusts the brightness, contrast, and color temperature of an image by gradually increasing or decreasing the brightness, contrast and color temperature in amounts determined by the two color variables.

11. A method for automatically adjusting an image condition comprising:
   (a) sensing data representing an environmental brightness and color temperature, and outputting the sensed data;
   (b) receiving and digitizing the same sensed data to obtain both the environmental brightness and the color temperature, and automatically adjusting one of the brightness, with the color temperature, and the contrast with the color temperature of an image utilizing the obtained same sensed data in consideration of a brightness, contrast and color temperature selected by a user; and
   (c) displaying the adjusted image on a display.

12. A method of claim 11, wherein in step (a), outputting the sensed data by two electrical signals; and in step (b) digitizing the two electrical signals to concurrently determine the environmental brightness and the color temperature.

13. A method of claim 12, wherein in step (a), outputting electrical signals of cyan and yellow; and in step (b), determining the environmental brightness by summing the outputs of cyan and yellow, and determining the environmental color temperature by talking the ratio of the output cyan to the output yellow.

14. A method of claim 12, wherein step (b) comprises:
   (aa) storing the brightness, contrast and color temperature selected by the user;
   (bb) determining the environmental brightness and color temperature, and determining relative variances of brightness, contrast and color temperature according to the determined environmental brightness: and color temperature; and
   (cc) outputting control signals to automatically adjust the brightness, contrast and color temperature of the image based upon the relative variances and the stored brightness, contrast and color temperature.

15. A method of claim 14, wherein step (b) further comprises:
   amplifying a video signal according to the output control signals; and
   processing the amplified video signal and displaying the processed video signal on the color display tube.

16. A method of claim 14, wherein step (bb) comprises:
   storing reference environmental values of brightness and color temperature;
   determining the environmental brightness and color temperature based upon the at least two electrical signals;
   calculating average environmental values of brightness and color temperature for a predetermined time period, and comparing the average environmental values to the stored reference environmental values to output compared values; and
   determining relative variances utilizing the compared values, and outputting control signals to automatically adjust the image by an amount based upon the determined relative variances and the brightness, contrast, and color temperature selected by the user.

17. A method of claim 16, wherein the two electrical signals are cyan and yellow; and the environmental brightness is determined by summing the outputs of cyan and yellow, and the environmental color temperature is determined by taking the ratio of the output cyan to the output yellow.

18. A method of claim 11, wherein the brightness, contrast and color temperature of an image is automatically adjusted if the user selects an auto-regulation mode.

19. A method of claim 11, wherein the brightness and contrast of an image is automatically adjusted if the user selects an auto-regulation mode for brightness and contrast, and the color temperature of an image is automatically adjusted if the user selects an auto-regulation mode for color temperature.

20. A method of claim 11, wherein the brightness, contrast, and color temperature of an image is automatically adjusted by gradually increasing or decreasing the brightness, contrast and color temperature.

21. The device of claim 10, wherein the automatic adjustments are made one of periodically, continuously and at every prescribed amount of change of one of the environmental brightness and the color temperature.

22. The device of claim 21, wherein the prescribed amount of change of the environmental brightness is 50 lux and the prescribed amount of change of the color temperature is 1000° K.

23. The device of claim 1, wherein the color variables are subtractive colors.

24. The device of claim 1, wherein the sensor unit senses the two color variables without user awareness.

25. The method of claim 11, wherein the sensing data representing an environmental brightness and color temperature is performed without user awareness.

26. The method of claim 11, wherein the same sensed data is exactly two color signals.

27. A device for adjusting an image condition comprising:
   a sensor unit sensing an environmental brightness and color temperature, and outputting the sensed data;
   a video processor receiving and digitizing the output signals from the sensor unit to obtain the environmental brightness and color temperature, and adjusting the brightness, contrast, and color temperature of an image utilizing the obtained data in consideration of a brightness, contrast and color temperature selected by a user; and
   a display unit displaying the adjusted image on a display, wherein the sensor unit is a photo sensor that outputs electrical signals of cyan and yellow, and wherein the video processor determines the environmental brightness by summing the outputs of cyan and yellow, and determines the environmental color temperature by taking a ratio of the output yellow and the output cyan.

* * * * *